US012561454B2

(12) United States Patent
Gomes et al.

(10) Patent No.: US 12,561,454 B2
(45) Date of Patent: Feb. 24, 2026

(54) PROTECTION OF DATA KEYS USED IN CRYPTOGRAPHIC PROCESSING

(71) Applicant: INTERNATIONAL BUSINESS MACHINES CORPORATION, Armonk, NY (US)

(72) Inventors: Louis P. Gomes, Poughkeepsie, NY (US); Jonathan D. Bradbury, Poughkeepsie, NY (US); Reinhard Theodor Buendgen, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 18/620,364

(22) Filed: Mar. 28, 2024

(65) Prior Publication Data

US 2025/0307432 A1      Oct. 2, 2025

(51) Int. Cl.
  *G06F 21/00*        (2013.01)
  *G06F 21/60*        (2013.01)
(52) U.S. Cl.
  CPC .................................. *G06F 21/602* (2013.01)
(58) Field of Classification Search
  CPC ..................................................... G06F 21/602
  See application file for complete search history.

(56) References Cited

U.S. PATENT DOCUMENTS 8,302,169 B1 * 10/2012 Presotto .............. G06F 21/6218
                                                        726/19
10,585,809 B2    3/2020 Durham et al.

11,599,648 B1 *  3/2023 Ashkenazi ............ H04L 9/0819
2008/0046757 A1 *  2/2008 Staddon ................ H04L 9/0894
                                                        713/193
2009/0208002 A1 *  8/2009 Koehane ................ H04L 9/002
                                                        713/189
2012/0079285 A1    3/2012 Gueron et al.

(Continued)

FOREIGN PATENT DOCUMENTS

AU            2017341251 A1      4/2019
WO      WO2010054369 A1      5/2010

OTHER PUBLICATIONS

Liskov, Moses et al., "Tweakable Block Ciphers," Advances in Cryptology—Crypto 2002, 2002 (no further date information available), pp. 1-16.

(Continued)

*Primary Examiner* — Mahfuzur Rahman
(74) *Attorney, Agent, or Firm* — Teddi Maranzano, Esq.; Blanche E. Schiller, Esq.; Heslin Rothenberg Farley & Mesiti P.C.

(57)        ABSTRACT

A set of data keys arranged in a particular order is obtained. The set of data keys includes multiple data keys. The multiple data keys include a protected key. The protected key is prevented from being in a selected position within the particular order. The set of data keys is encrypted as a single encrypted key. The single encrypted key is an encryption of the multiple data keys. The single encrypted key is returned. The single encrypted key is to be decrypted to obtain multiple decrypted keys. At least one decrypted key of the multiple decrypted keys is a decrypted protected key to be used in encryption of a confidential value.

20 Claims, 11 Drawing Sheets

(56) References Cited

U.S. PATENT DOCUMENTS

| | | | | |
|---|---|---|---|---|
| 2013/0238581 | A1* | 9/2013 | Franzki | G06F 21/6209 |
| | | | | 707/705 |
| 2014/0156791 | A1* | 6/2014 | Sant | H04N 21/6181 |
| | | | | 709/217 |
| 2015/0058639 | A1 | 2/2015 | Hasegawa | |
| 2015/0169472 | A1 | 6/2015 | Yap et al. | |
| 2015/0222950 | A1* | 8/2015 | Sant | H04N 21/84 |
| | | | | 725/18 |
| 2016/0352518 | A1* | 12/2016 | Ford | G06F 21/6218 |
| 2019/0147192 | A1* | 5/2019 | Khosravi | G06F 21/575 |
| | | | | 713/192 |
| 2020/0134234 | A1* | 4/2020 | LeMay | G06F 21/602 |
| 2020/0201789 | A1* | 6/2020 | Durham | H04L 9/0894 |
| 2020/0250318 | A1* | 8/2020 | Al Belooshi | H04L 9/0662 |
| 2021/0263779 | A1* | 8/2021 | Haghighat | G06F 9/5061 |
| 2021/0328790 | A1* | 10/2021 | Eckel | H04L 9/14 |
| 2022/0100911 | A1* | 3/2022 | Trikalinou | G06F 12/145 |
| 2022/0350752 | A1* | 11/2022 | Nasser | G06F 12/1475 |
| 2023/0325326 | A1 | 10/2023 | Balakrishnan | |
| 2023/0401328 | A1* | 12/2023 | Zhu | G06F 21/602 |
| 2025/0258935 | A1* | 8/2025 | Shintani | G06F 21/6245 |

OTHER PUBLICATIONS

Ahmed, Shkil et al., "An Effective Storage Encryption Solution," Indian Journal of Science and Technology, Apr. 2013. pp. 4384-4389.
IBM, "z/Architecture Principles of Operation," IBM Publication No. SA22-7832-13, Fourteenth Edition, May 2022, pp. 1-2124.
Dworkin, Morris, "Recommendation for Block Cipher Modes of Operation: The XTS-AES Mode for Confidentiality on Storage Devices," National Institute of Standards and Technology, NIST Special Publication 800-38E, Jan. 2010, 12 pages.
International Searching Authority, "Notification of Transmittal of the International Search Report and the Written Opinion of the International Searching Authority, or Declaration," Patent Cooperation Treaty Jun. 17, 2025, 12 pages, International Application No. PCT/ EP2025/058020.

* cited by examiner

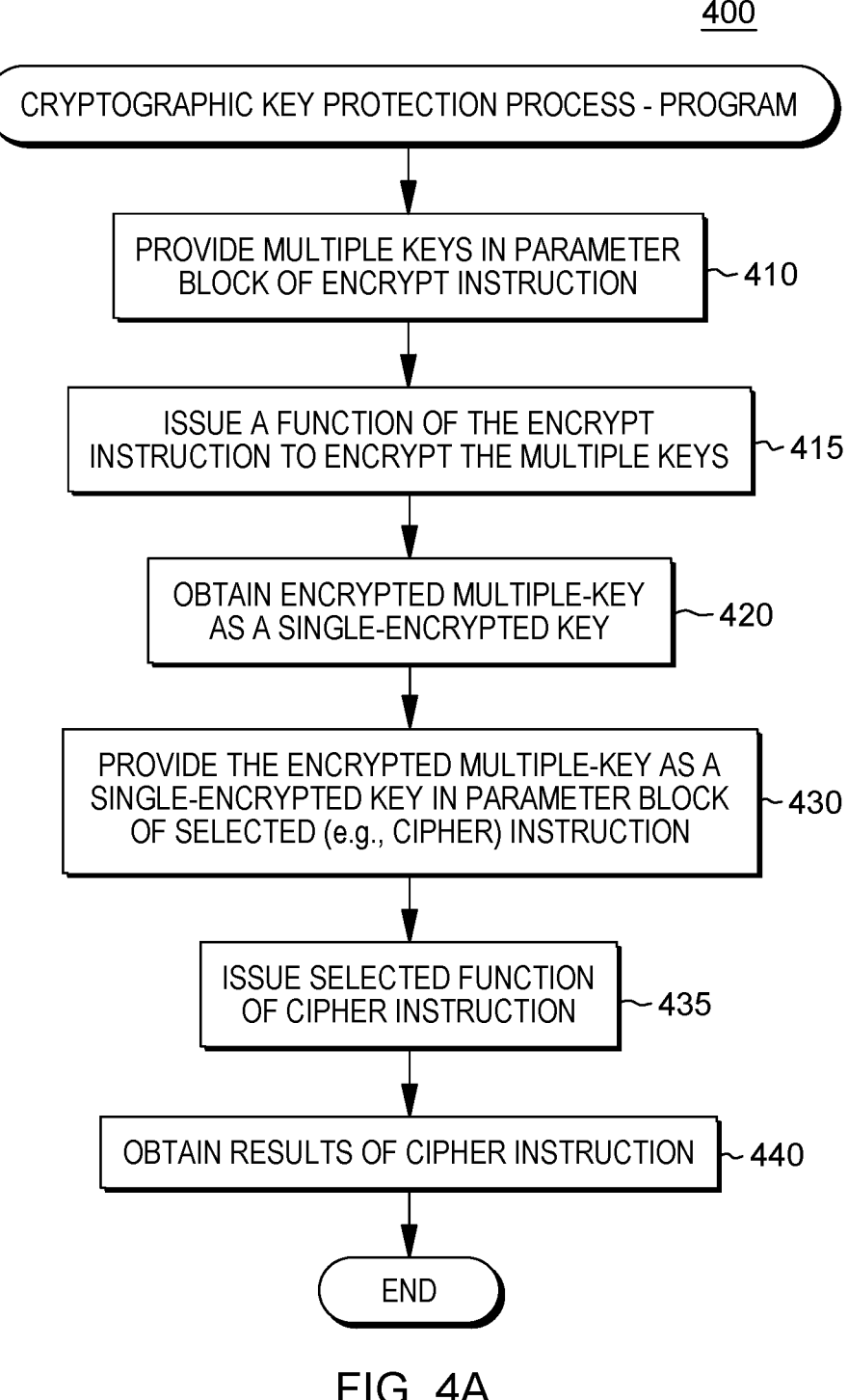

400

CRYPTOGRAPHIC KEY PROTECTION PROCESS - PROGRAM

PROVIDE MULTIPLE KEYS IN PARAMETER BLOCK OF ENCRYPT INSTRUCTION ~410

ISSUE A FUNCTION OF THE ENCRYPT INSTRUCTION TO ENCRYPT THE MULTIPLE KEYS ~415

OBTAIN ENCRYPTED MULTIPLE-KEY AS A SINGLE-ENCRYPTED KEY ~420

PROVIDE THE ENCRYPTED MULTIPLE-KEY AS A SINGLE-ENCRYPTED KEY IN PARAMETER BLOCK OF SELECTED (e.g., CIPHER) INSTRUCTION ~430

ISSUE SELECTED FUNCTION OF CIPHER INSTRUCTION ~435

OBTAIN RESULTS OF CIPHER INSTRUCTION ~440

END

FIG. 4A

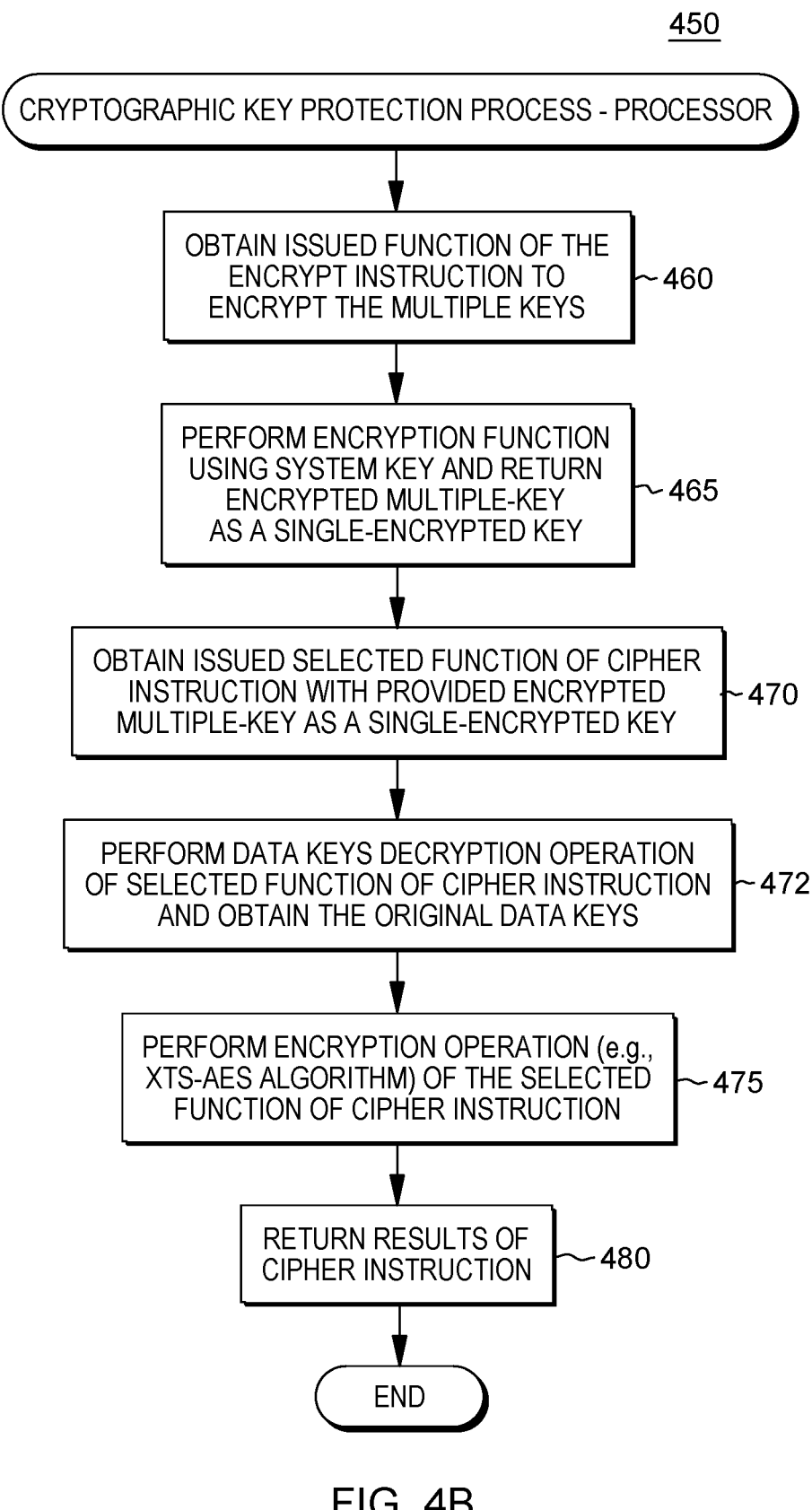

450

CRYPTOGRAPHIC KEY PROTECTION PROCESS - PROCESSOR

OBTAIN ISSUED FUNCTION OF THE ENCRYPT INSTRUCTION TO ENCRYPT THE MULTIPLE KEYS ~460

PERFORM ENCRYPTION FUNCTION USING SYSTEM KEY AND RETURN ENCRYPTED MULTIPLE-KEY AS A SINGLE-ENCRYPTED KEY ~465

OBTAIN ISSUED SELECTED FUNCTION OF CIPHER INSTRUCTION WITH PROVIDED ENCRYPTED MULTIPLE-KEY AS A SINGLE-ENCRYPTED KEY ~470

PERFORM DATA KEYS DECRYPTION OPERATION OF SELECTED FUNCTION OF CIPHER INSTRUCTION AND OBTAIN THE ORIGINAL DATA KEYS ~472

PERFORM ENCRYPTION OPERATION (e.g., XTS-AES ALGORITHM) OF THE SELECTED FUNCTION OF CIPHER INSTRUCTION ~475

RETURN RESULTS OF CIPHER INSTRUCTION ~480

END

FIG. 4B

PERFORM CRYPTOGRAPHIC KEY
MANAGEMENT OPERATION            500

OPCODE

502

510

GR0  FUNCTION CODE

512

520

GR1  PARAMETER BLOCK ADDRESS

522

PARAMETER BLOCK     530

CRYPTOGRAPHIC KEY 1          532

CRYPTOGRAPHIC KEY 2          534

AES WRAPPING KEY
VERIFICATION PATTERN         536

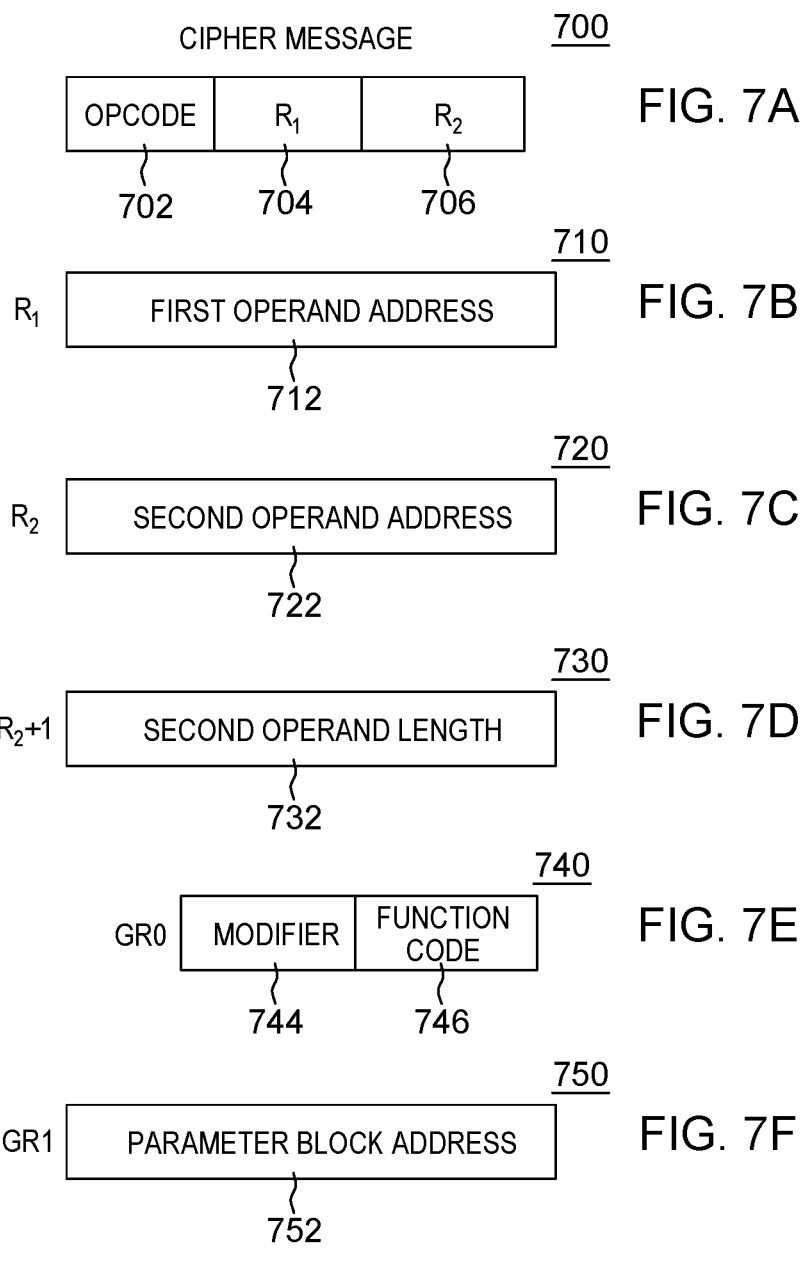
CIPHER MESSAGE    <u>700</u>
| OPCODE | R₁ | R₂ |
|--------|----|----|
702     704     706
FIG. 7A
<u>710</u>
R₁   FIRST OPERAND ADDRESS
712
FIG. 7B
<u>720</u>
R₂   SECOND OPERAND ADDRESS
722
FIG. 7C
<u>730</u>
R₂+1   SECOND OPERAND LENGTH
732
FIG. 7D
<u>740</u>
GR0   | MODIFIER | FUNCTION CODE |
744     746
FIG. 7E
<u>750</u>
GR1   PARAMETER BLOCK ADDRESS
752
FIG. 7F
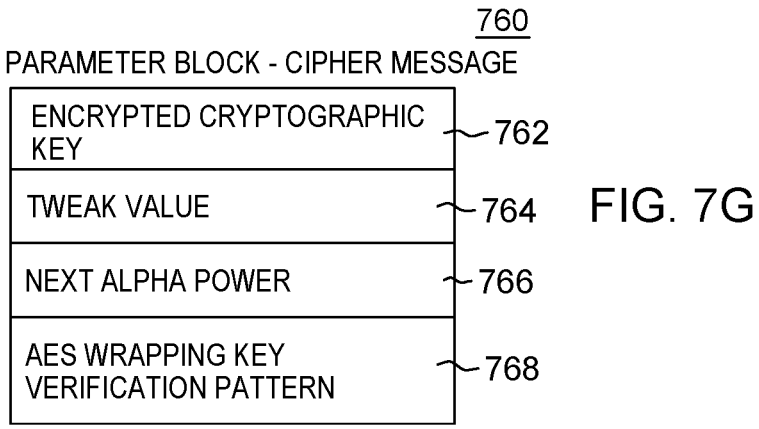
<u>760</u>
PARAMETER BLOCK - CIPHER MESSAGE
| ENCRYPTED CRYPTOGRAPHIC KEY | ~762 |
| TWEAK VALUE | ~764 |
| NEXT ALPHA POWER | ~766 |
| AES WRAPPING KEY VERIFICATION PATTERN | ~768 |
FIG. 7G

36

PROTECTION OF DATA KEYS USED IN CRYPTOGRAPHIC PROCESSING

BACKGROUND

One or more aspects relate, in general, to cryptographic processing within a computing environment, and in particular, to the protection of data keys used in cryptographic processing.

Cryptography is used for the protection of data. There are a number of cryptographic algorithms, including the XTS-AES (XEX (XOR Encrypt XOR) Tweakable Block Cipher with Ciphertext Stealing-Advanced Encryption Standard) algorithm, as well as others. The XTS-AES standard uses a confidential value (e.g., a tweak value) to provide added protection. The confidential value is encrypted using a data key, referred to as a protected key.

Processing related to using the protected data key is to be enhanced.

SUMMARY

Shortcomings of the prior art are overcome, and additional advantages are provided through the provision of a computer program product. The computer program product includes a set of one or more computer readable storage media and program instructions, collectively stored in the set of one or more computer readable storage media, for causing at least one computing device to perform computer operations. The computer operations include obtaining a set of data keys arranged in a particular order. The set of data keys includes multiple data keys. The multiple data keys include a protected key. The protected key is prevented from being in a selected position within the particular order. The set of data keys is encrypted as a single encrypted key. The single encrypted key is an encryption of the multiple data keys. The single encrypted key is returned. The single encrypted key is to be decrypted to obtain multiple decrypted keys. At least one decrypted key of the multiple decrypted keys is a decrypted protected key to be used in encryption of a confidential value.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4A depicts one example of cryptographic key protection processing of a program, in accordance with one or more aspects of the present disclosure;

FIG. 4B depicts one example of cryptographic key protection processing of a processor, in accordance with one or more aspects of the present disclosure;

FIG. 7A depicts one example of a format of a Cipher Message instruction, in accordance with one or more aspects of the present disclosure;

FIGS. 7B-7D depict examples of contents of registers used by the Cipher Message instruction of FIG. 7A, in accordance with one or more aspects of the present disclosure;

FIGS. 7E-7F depict examples of contents of general registers used by the Cipher Message instruction of FIG. 7A, in accordance with one or more aspects of the present disclosure;

FIG. 7G depicts one example of a parameter block used by the Cipher Message instruction of FIG. 7A, in accordance with one or more aspects of the present disclosure;

DETAILED DESCRIPTION

Figure 1:
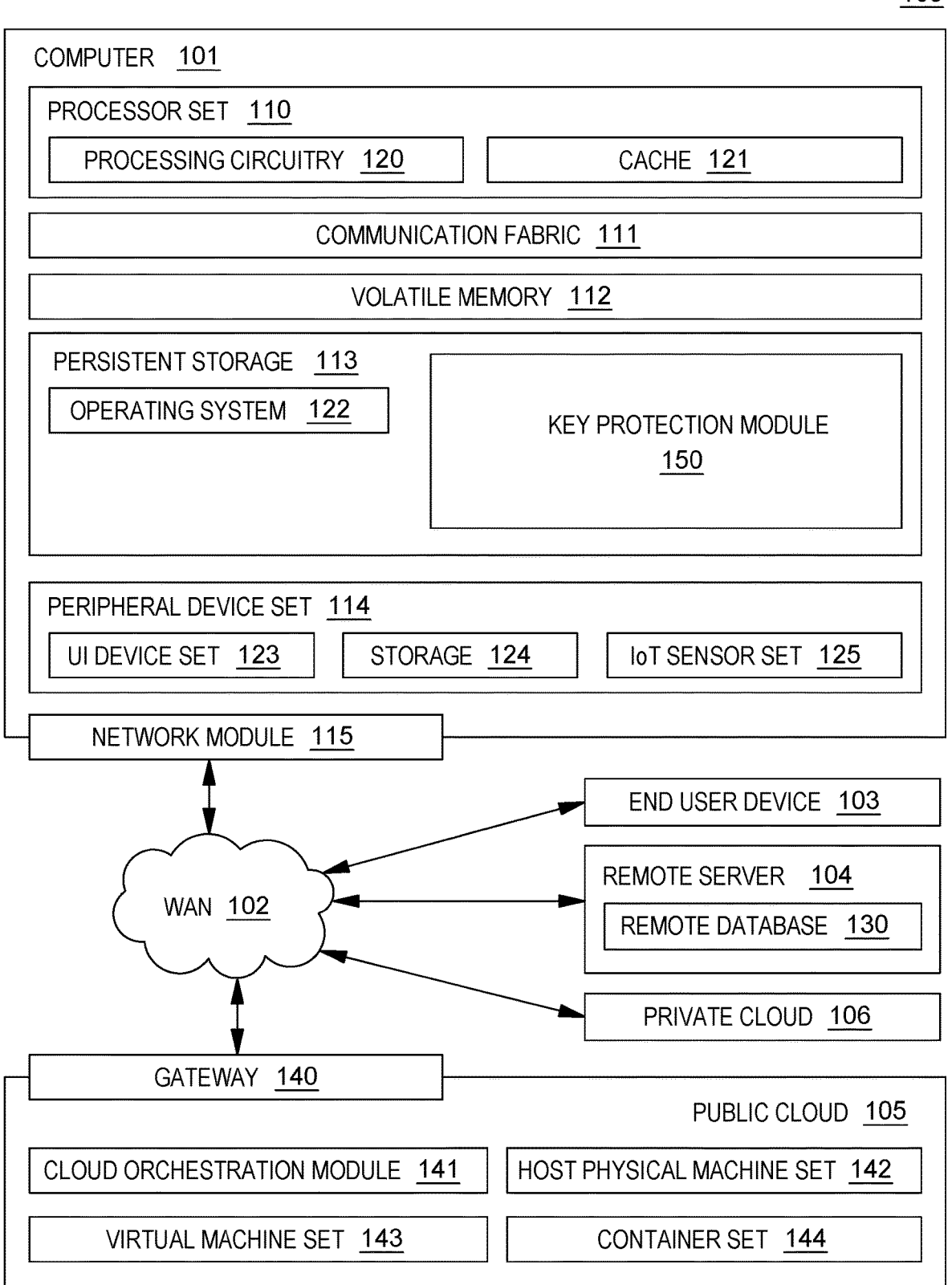
FIG. 1 depicts one example of a computing environment to incorporate and use one or more aspects of the present disclosure.

In accordance with one or more aspects of the present disclosure, a capability is provided to protect a protected key used in encryption/decryption of confidential data. In one example, the confidential data is a tweak value used in encryption/decryption and the protected key is a key used to encrypt/decrypt the tweak value. The protected key is protected to provide additional protection for the confidential data. For instance, by protecting the protected key used in encrypting the tweak value, it is more difficult to discover and use the tweak value.

In one or more aspects, a set of data keys (e.g., multiple data keys) is encrypted as a single encrypted data key. The data keys of the set of data keys are in a particular order, and in one example, the particular order prevents the protected key from being in a selected position (e.g., first in the set of data keys).

In one example, if the set of data keys exclusively includes protected keys, then a fake data key is generated and included in the selected position. In one example, the encryption of the set of data keys as a single encrypted data key is performed by an architected instruction. An output of the architected instruction is the single encrypted data key (also referred to herein as a single encrypted key, an encrypted multiple-key as a single-encrypted-key, etc.).

In one example, a cipher block chaining technique is used to encrypt the set of data keys as a single encrypted data key to protect the protected key(s). The cipher block chaining technique encrypts a sequence of bits as a block (referred to as a plaintext block) using a cipher key applied to the block. The first plaintext block of the chain is XORed with, e.g., an initialization vector or an initial chaining value to create a random or pseudorandom output that is then encrypted to provide an encrypted block. The next plaintext block of the chain is similarly XORed and then encrypted but the XOR is now with the previously encrypted block, and so on. In one example, the size of the data block used in the cipher block chaining technique is at most the size of a single data key size.

As indicated, in one example, the cipher block chaining technique feeds the output of the current ciphered data block to the next cipher data block to scramble the next data key part to protect the next ciphered data block. However, an initial chaining value of zero can be used to effectively bypass the scrambling of the first data key part. Since the program does not provide the initial chaining value for the non-first cipher data block part (data key part), scrambling the non-first data key part provides added protection to all non-first data key parts.

In one or more aspects, the single encrypted key representing the set of data keys is decrypted to provide multiple decrypted keys, one or more of which are used to encrypt confidential data. For instance, the decrypted protected key is used to encrypt the tweak value. One or more other decrypted keys of the multiple decrypted keys are used to encrypt plaintext (e.g., a message). Other examples are possible.

In one or more aspects, the decryption of the single encrypted key and the encryption of the confidential data (and/or the encryption of the plaintext) are performed by a single architected instruction, in which the decrypted keys are protected from being seen in the clear outside of the instruction processing, thus further protecting the confidential data to be encrypted using the decrypted data keys. In one or more aspects, the single architected instruction used to decrypt the single encrypted key and to encrypt using the decrypted keys is different than another architected instruction used to encrypt the set of data keys as the single encrypted key.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs key protection, cryptographic processing (e.g., encryption and/or decryption) and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as key protection code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
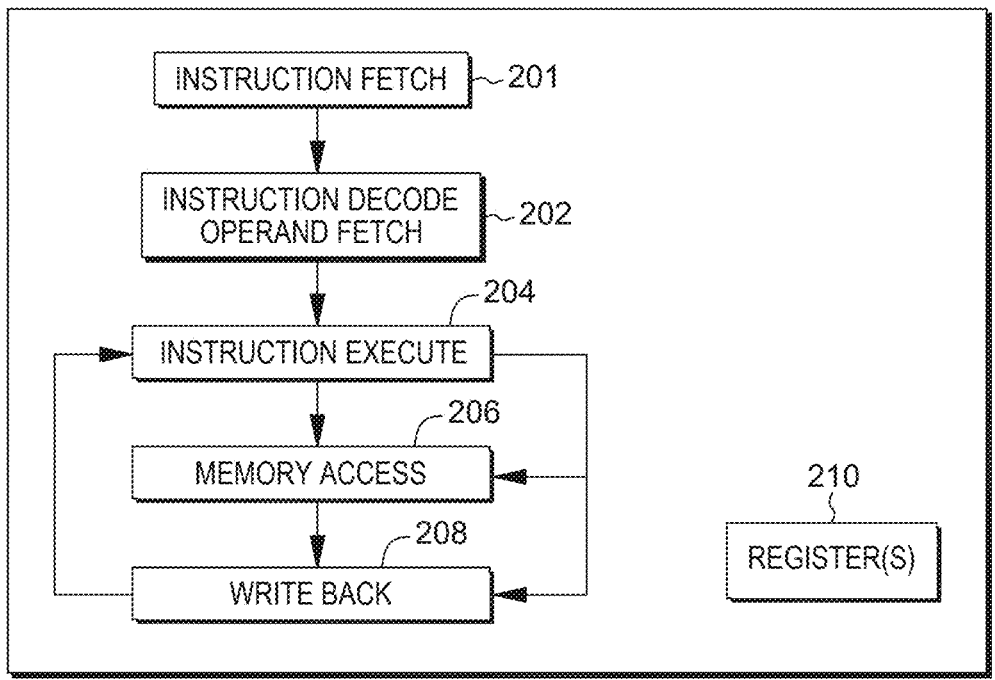
FIG. 2 depicts one example of further details of a processor of the processor set of FIG. 1, in accordance with one or more aspects of the present disclosure.

In one example, referring to FIG. 2, a processor 200 (e.g., of processor set 110) includes a plurality of functional components (or a subset thereof) used to execute instructions. As depicted in FIG. 2, in one example, these functional components include, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use key protection module 150. Additionally, fewer and/or other components may be used in one or more aspects of the present disclosure.

In one example, a key protection module (e.g., key protection module 150) is used, in accordance with one or more aspects of the present disclosure. A key protection module (e.g., key protection module 150) includes code or instructions used to protect data keys, also referred to as keys or cryptographic keys, and/or perform other tasks, in accordance with one or more aspects of the present disclosure. A key protection module (e.g., key protection module 150) includes, in one example, various sub-modules to be used to protect data keys. The sub-modules are, e.g., computer readable program code (e.g., instructions) in computer readable media, e.g., storage (persistent storage 113, cache 121, storage 124, other storage, as examples). The computer readable storage media may be part of one or more computer program products and the computer readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Figure 3A:
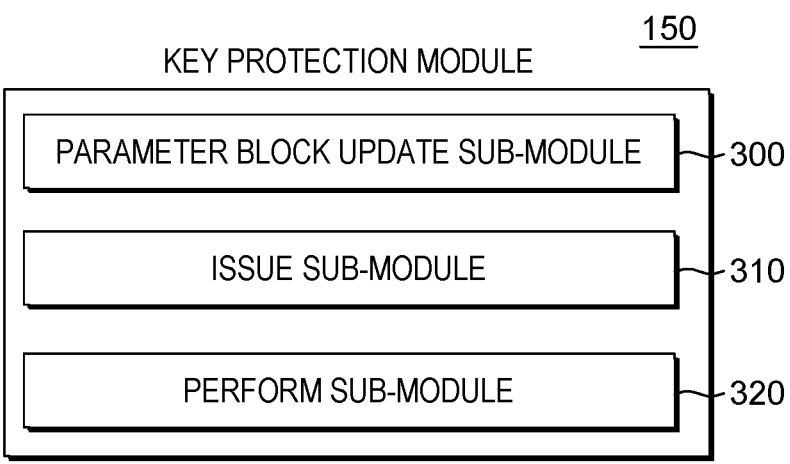
FIG. 3A depicts one example of sub-modules of a key protection module of FIG. 1, in accordance with one or more aspects of the present disclosure.

One example of key protection module 150 is described with reference to FIG. 3A. In one example, key protection module 150 includes a parameter block update sub-module 300 to update one or more parameter blocks to be used by one or more instructions, in accordance with one or more aspects of the present disclosure; an issue sub-module 310 to issue one or more instructions used in accordance with one or more aspects of the present disclosure; and a perform sub-module 320 to perform one or more selected functions and/or operations of a selected instruction used in accordance with one or more aspects of the present disclosure.

Figure 3B:
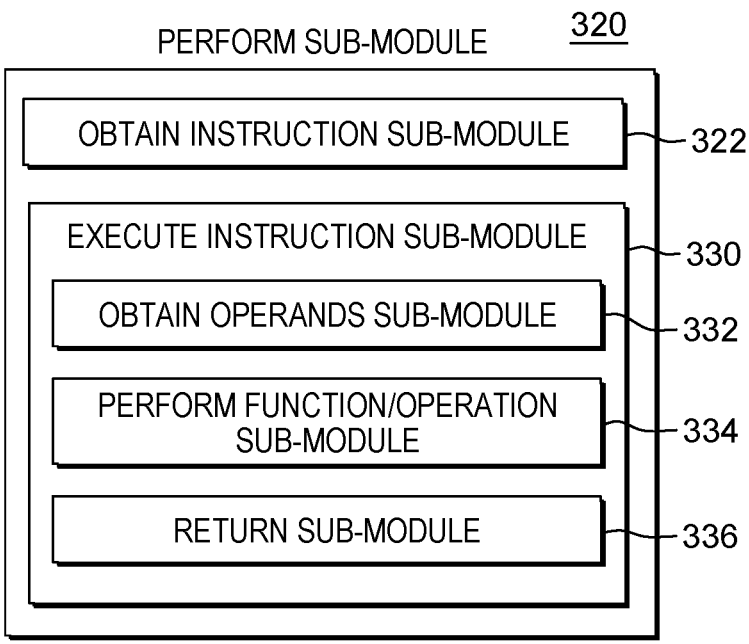
FIG. 3B depicts one example of sub-modules of the perform sub-module of FIG. 3A, in accordance with one or more aspects of the present disclosure.

Further details of perform sub-module 320 are described with reference to FIG. 3B. In one example, perform sub-module 320 includes an obtain instruction sub-module 322 to obtain (e.g., receive, be provided, pull, retrieve, fetch, etc.) a selected instruction (e.g., a perform cryptographic key management operation instruction and/or a cipher message instruction) to be executed, and an execute instruction sub-module 330 to be used to execute the selected instruction. The execute instruction sub-module 330 includes, for instance, an obtain operands sub-module 332 to obtain one or more operands and/or other information of the selected instruction; a perform function/operation sub-module 334 to perform one or more functions/operations of a selected instruction; and a return sub-module 336 to return results of the executed instruction.

One or more of the sub-modules (e.g., sub-modules 300-322, 330-336) are used, in accordance with one or more aspects of the present disclosure, to perform, at least, key protection processing. In one example, referring to FIG. 4A, a cryptographic key protection process of a program 400 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the process and/or aspects thereof. Many examples are possible.

Referring to FIG. 4A, in one example, cryptographic key protection process of a program 400 (also referred to as process 400) provides 410 a set of data keys (e.g., multiple data keys) in a parameter block of an encrypt instruction. In one example, the encrypt instruction is a perform cryptographic key management operation instruction, and the format and contents of the parameter block are dependent on the function to be performed by the instruction. In one example, process 400 provides multiple (e.g., 2 or another number of) clear XTS-AES algorithm data keys (e.g., key 1, key 2, etc.) in the parameter block (e.g., using parameter block update sub-module 300). In one example, one of the keys (e.g., key 2) is a protected key, since it is used to encrypt confidential data (e.g., a tweak value). This protected key (e.g., key 2) is placed within the parameter block in a position other than the first position, such as the last key (or other than the first key) in the set of data keys.

To further explain, in one or more aspects, the data keys of the set of data keys placed in the parameter block are in a particular order. In one example, the particular order includes placing the protected keys (e.g., keys used to encrypt/decrypt confidential data, such as tweak values and/or other confidential data) in any position but the first position. If, in one example, all the data keys of the set of data keys are protected keys, then a fake data key is placed in the first position. In one example, the particular order (aside from the first position) is in the order of use of the data keys by the hardware. Other examples are possible.

Process 400 issues 415 a function of the encrypt instruction to encrypt the multiple keys (e.g., using issue sub-module 310). For example, process 400 issues a perform cryptographic key management operation instruction, and in one example, a particular function of the instruction referred to herein as an AES-XTS double (e.g., or multiple (e.g., two or more)) key encrypt function of the perform cryptographic key management operation instruction. The function is performed (e.g., using perform sub-module 320) by one or more computing devices (e.g., one or more processors 200; other computing device(s)) to generate a single encrypted key from the encryption of multiple data keys (referred to herein as an encrypted multiple-key as a single-encrypted-key), as described further below with reference to FIG. 4B.

Process 400 obtains 420 the encrypted multiple-key as a single-encrypted-key. For example, process 400 obtains (e.g., receives, retrieves, fetches, is provided, pulls, etc.) an encrypted XTS-AES multiple (e.g., double) key (e.g., the encrypted multiple-key as a single-encrypted-key) from execution of a key encrypt function of the perform cryptographic key management operation instruction.

Process 400 provides 430 the encrypted multiple-key as a single-encrypted-key in a parameter block (e.g., using parameter block update sub-module 300) of a selected instruction (e.g., a selected cipher instruction). As an example, the selected instruction is a cipher message instruction. The encrypted multiple-key as a single-encrypted-key includes, for instance, multiple (e.g., two) XTS-AES algorithm data keys (e.g., key 1 and key 2), and the confidential data (e.g., tweak value) data key (e.g., key 2) is the last key (or another position other than the first position, if there are more than two keys).

Process 400 issues 435 (e.g., using issue sub-module 310) a selected function of the selected cipher instruction. For example, process 400 issues a cipher message instruction, and, as an example, a cipher message full XTS-AES function of the cipher message instruction. The selected function is performed by one or more computing devices (e.g., one or more processors 200; other computing device(s)), and a result of the function is returned, as described further below with reference to FIG. 4B.

Process 400 obtains 440 results of the selected cipher instruction.

Further details of one example of one or more computing devices performing the functions/operations issued by process 400 are described with reference to FIG. 4B. In one example, a cryptographic key protection process of a processor 450 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible. One or more of the sub-modules (e.g., sub-modules 320-336) are used, in accordance with one or more aspects of the present disclosure, to perform the cryptographic key protection processing.

Referring to FIG. 4B, in one example, cryptographic key protection process of a processor 450 (also referred to as process 450) obtains 460 (e.g., receives, retrieves, fetches, is provided, pulls, etc.) the issued function of the encrypt instruction to encrypt the multiple keys. For example, it obtains the issued perform cryptographic key management operation instruction (e.g., using obtain instruction sub-module 322) indicating the encrypt function to be performed and including the parameter block having the set of clear data keys (e.g., key 1, key 2) to be encrypted.

Process 450 performs 465 an encryption function using a system key and returns a result (e.g., the encrypted multiple-key as a single-encrypted-key). For instance, the processor executes (e.g., using execute instruction sub-module 330) the obtained perform cryptographic key management operation instruction to encrypt multiple (e.g., two) XTS-AES data keys (e.g., key 1 and key 2) as a multiple-key using the system's AES wrapping key (WK_a), as described in further detail below. The generation of the single encrypted key is performed such that the single encrypted key cannot be used to perform cryptographic operations that only use the protected key (e.g., to extract the encrypted protected key.) The perform cryptographic key management operation returns the encrypted multiple-key as a single-encrypted-key in the parameter block (e.g., same area where the clear data keys were in the parameter block).

Based on returning the encrypted multiple-key as a single-encrypted-key to the program, in one example, the program issues a selected function of a cipher instruction with the provided encrypted multiple-key as a single-encrypted key, which is obtained by process 450. For instance, process 450 obtains 470 (e.g., receives, retrieves, fetches, is provided, pulls, etc.) one of the cipher message full XTS-AES functions of the cipher message instruction issued by the program. Thus, in one example, one function (e.g., an encrypt data keys function, e.g., of one architected instruction) encrypts the data keys providing the encrypted multiple-key as a single-encrypted key, which is input to another function (e.g., a cipher message function of another architected instruction). The cipher message function is different from the encrypt data keys function, and in one example, the one architected instruction is a different architected instruction than the other architected instruction. The cipher message function performs one operation to decrypt the encrypted multiple-key as a single-encrypted-key providing multiple data keys in the clear, and then uses the individual clear keys to perform respective cipher operations, as described herein.

For example, based on obtaining the selected function (e.g., a cipher message full XTS-AES function), process 450 executes the instruction to perform 472, 475 multiple operations of the selected function. For instance, process 450 performs 472 a data keys decryption operation (of the selected function of the cipher instruction) on the encrypted multiple-key as a single-encrypted-key using the system key to obtain the original (clear) multiple XTS-AES algorithm data keys. As an example, process 450 executes (e.g., using execute sub-module 330) the decryption operation of the selected function of the cipher message to obtain the encrypted multiple-key (e.g., double key) as a single-encrypted-key from the parameter block and decrypt it using the system's AES wrapping key (WKa) to obtain multiple XTS-AES algorithm data keys (e.g., key 1, key 2, etc.) in the clear. In one example, the individual clear keys (e.g., key 1, key 2, etc.) are obtained based on a specific key position format. This is the same key position format used with the encrypt data keys instruction (e.g., perform cryptographic key management operation instruction) that generated the encrypted multiple-key as a single-encrypted-key. The encrypt data keys instruction and the cipher message instruction work together to protect the confidential data and the protected key(s).

Process 450 then performs 475 an encryption operation (e.g., XTS-AES algorithm) of the selected function of the cipher instruction to encrypt the tweak value using the protected key, e.g., key 2 and to encrypt a cipher message (e.g., plaintext) using a data key, e.g., key 1. In one example, for the XTS-AES algorithm, the encrypted tweak value is multiplied with another value (e.g., a next alpha power) to provide a mask, referred to herein as TAU, which is used, along with key 1, in encrypting plaintext blocks providing encrypted ciphertext blocks as cipher results. This processing is further described below.

Process 450 returns 480 (e.g., using return sub-module 336) the generated cipher results to the program.

As described above, the key protection processing uses various instructions, including, for instance, a cryptographic key management operation instruction and a cipher message instruction, examples of which are described below. One example of a cryptographic key management operation instruction is described with reference to FIGS. 5A-5D, and an example of a cipher message instruction is described with reference to FIGS. 7A-7G. Other examples are possible.

One example of a cryptographic key management operation instruction is a Perform Cryptographic Key Management Operation instruction. In one example, a cryptographic key management operation instruction, such as the Perform Cryptographic Key Management Operation instruction, is a single architected hardware machine instruction at the hardware/software interface. As an example, it is part of an instruction set architecture. One example of an instruction set architecture to incorporate and/or use a cryptographic key management operation instruction and/or aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

Figure 5A:
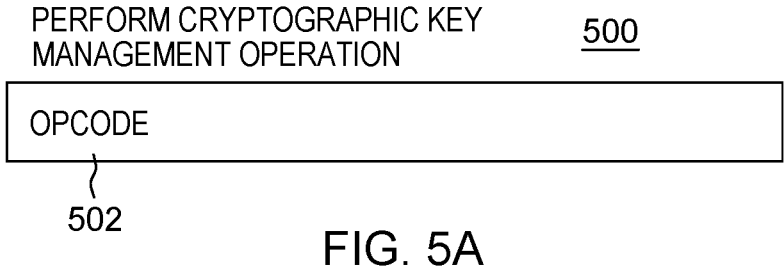
FIG. 5A depicts one example of a format of a Perform Cryptographic Key Management Operation instruction, in accordance with one or more aspects of the present disclosure.

Referring to FIG. 5A, in one example, a Perform Cryptographic Key Management Operation instruction 500 includes at least one operation code (opcode) field 502 having an operation code that indicates that this is a perform cryptographic key management operation. In one particular example, Perform Cryptographic Key Management Operation instruction 500 has a format, referred to as a register and register with an extended opcode format, having, e.g., 32 bits. In this particular example, Perform Cryptographic Key Management Operation instruction 500 has an operation code field 502 (e.g., bits 0-15). Although in this example there is one opcode field 502, in other examples, there may be more than one opcode field. For instance, there may be one opcode field at the beginning of the instruction format and one opcode field at the end of the instruction format. Other examples are also possible.

Figure 5B:
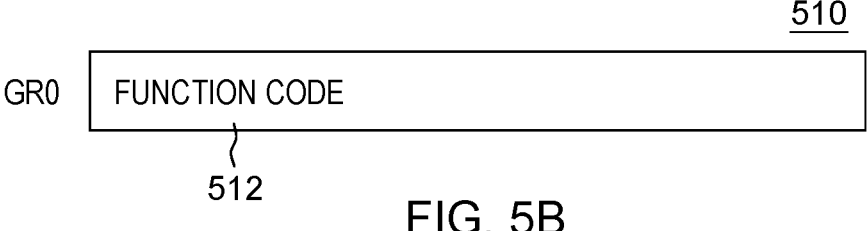
FIGS. 5B-5C depict examples of contents of general registers used by the Perform Cryptographic Key Management Operation instruction of FIG. 5A, in accordance with one or more aspects of the present disclosure.

In one example, the Perform Cryptographic Key Management Operation instruction uses multiple implied general registers, such as general register 0 (GR0) and general register 1 (GR1). These registers are referred to as implied registers since they are not explicitly referenced by one or more fields of the instruction; however, they are used by the instruction. One example of general register 0 is depicted in FIG. 5B. In one example, a general register 0 (510) includes a function code 512 (e.g., in bits 57-63) used to specify a function to be performed by the Perform Cryptographic Key Management Operation instruction. Further, in one example, a selected bit, e.g., bit 56 of general register 0, is to include a zero; otherwise, a specification exception is recognized. Other bits of general register 0 are ignored. This is only one example. In other examples, one or more bits or no bits are to include a specific value, such as zero. Further, in other examples, values other than zero may be used. Many examples are possible.

Example function codes that may be used for one or more aspects of the present disclosure include for instance, a function code (e.g., function code 20) that specifies, e.g., an encrypt AES-XTS (Advanced Encryption Standard-XEX (XOR encrypt XOR) Tweakable Block Ciphertext Stealing) 128 double key function, another function code (e.g., function code 22) that specifies, e.g., an encrypt AES-XTS 256 double key function, etc. Although example functions and/or function codes may be specified, additional, fewer and/or other functions/function codes may be specified and/or used. Many examples are possible.

Figure 5C:
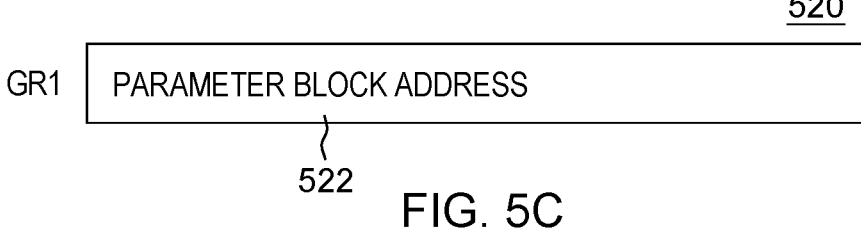

One example of general register 1 is depicted in FIG. 5C. In one example, a general register 1 (520) includes an address 522 of a parameter block in storage (e.g., memory, storage, etc.). For instance, address 522 is a logical address of, for instance, a leftmost byte of the parameter block in storage. In one example, the location of the address in the general register depends on the addressing mode. For instance, in the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address and the contents of bit positions 0-32 are ignored. In the 64-bit addressing mode, the contents of bit positions 0-63 of general register 1 constitute the address. In the access register mode, access register 1 specifies the address space containing the parameter block. Other examples are possible.

Figure 5D:
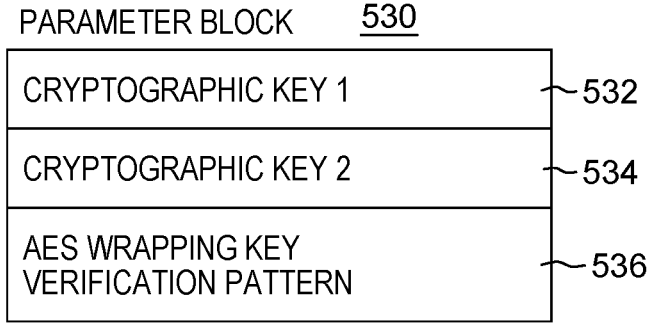
FIG. 5D depicts one example of a parameter block used by the Perform Cryptographic Key Management Operation instruction of FIG. 5A, in accordance with one or more aspects of the present disclosure.

One example of a parameter block used by the Encrypt AES-XTS 128 double-key function is described with reference to FIG. 5D. In one example, a parameter block, e.g., parameter block 530, used by the Encrypt AES-XTS 128 double-key function includes, for instance, a cryptographic key 1 (K1) 532 (e.g., byte offsets 0-15), a cryptographic key 2 (K2) 534 (e.g., byte offsets 16-31) and an AES wrapping key verification pattern (WK$_a$VP) 536 (e.g., byte offsets 32-63). In one example, a 32-byte cryptographic double-key including K1 and K2, in, e.g., byte offsets 0-31 of the parameter block is called a cryptographic key block. In other examples, the parameter block may include more than two keys and the encryption function is a multiple-key function. Further, other examples are possible, including other sizes of parameter blocks (that depend, e.g., on the function to be performed) and/or other information.

In one example, the parameter block used by the Encrypt AES-XTS 256 double-key function is similar to the one described with reference to FIG. 5D; however, for this function, cryptographic key 1 (K1) 532 is in, e.g., byte offsets 0-31; cryptographic key 2 (K2) 534 is in, e.g., byte offsets 32-63; and AES wrapping key verification pattern (WK$_a$VP) 536 is in, e.g., byte offsets 64-95. In one example, a 64-byte cryptographic double-key including K1 and K2, in, e.g., byte offsets 0-63 of the parameter block is called the cryptographic key block. In other examples, the parameter block may include more than two keys and the encryption function is a multiple-key function. Further, other examples are possible, including other sizes of parameter blocks (that depend, e.g., on the function to be performed) and/or other information.

In one example, the Perform Cryptographic Key Management Operation instruction is executed (e.g., using execute instruction sub-module 330). Based on executing the instruction, the opcode is obtained indicating that this is a key management operation (e.g., using obtain operands sub-module 332). Further, the function code specifying, e.g., an encrypt AES-XTS double (or multiple) key function and an address of the parameter block to be used are obtained (e.g., using obtain operands sub-module 332). The specified function is performed (e.g., using perform function/operation sub-module 334).

For each function (e.g., the Encrypt AES-XTS 128 double-key function, the Encrypt AES-XTS 256 double-key function, etc.), the cryptographic key block (e.g., 32-byte, 64-byte, respectively) obtained from, e.g., parameter block 530 is encrypted using the AES wrapping key. In one example, the wrapping key is obtained from one or more wrapping key registers provided for the configuration. The result of the encryption (e.g., the encrypted multiple-key as a single-encrypted-key) is placed back in the byte offsets (e.g., 0-31, 0-63, respectively) of the parameter block. The contents of an AES wrapping key verification pattern register provided for the configuration are placed in, e.g., AES wrapping key verification pattern 536 of the parameter block (e.g., byte offsets 32-63, 64-95, respectively).

Figure 6A:
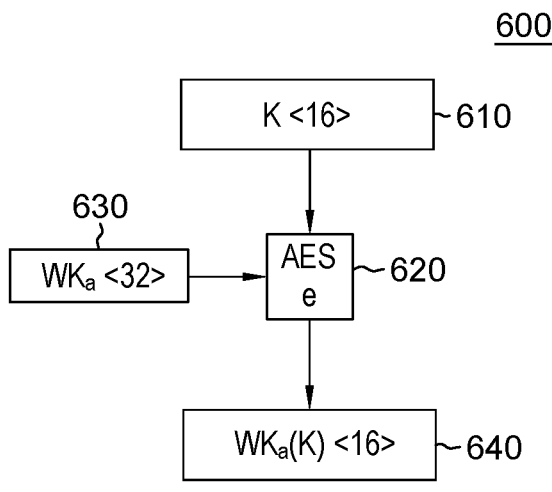
FIGS. 6A-6B depict examples of encrypting keys, in accordance with one or more aspects of the present disclosure.

One example of encrypting a key, such as a 128-bit AES key, is depicted in FIG. 6A. In one example of an encryption process 600, a key 610, such as a 128-bit AES key, is encrypted 620 using an AES algorithm and a wrapping key 630 (e.g., a 256-byte AES wrapping key) to produce a result 640, such as an encrypted 128-bit AES key. In FIG. 6A, K is an unencrypted key (e.g., a 128-bit AES key), <n> is a length of an item in bytes and $WK_a(K)$ is an encrypted 128-bit AES key.

Figure 6B:
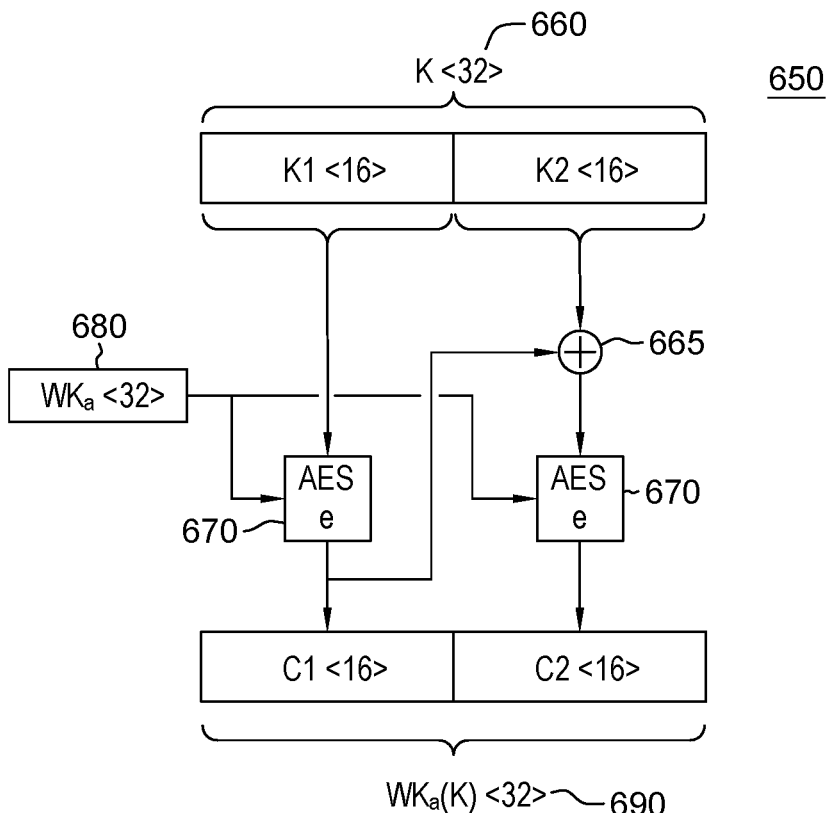

Further, one example of encrypting a key, such as a 256-bit AES key, is depicted in FIG. 6B. In one example of an encryption process 650, a key 660, such as a 256-bit AES key (e.g., K1, K2) is encrypted 670 using an AES algorithm and a wrapping key 680 (e.g., a 256-byte AES wrapping key) to produce a result 690, such as an encrypted 256-bit AES key. In FIG. 6B, K is an unencrypted key (e.g., a 256-bit AES key), <n> is a length of an item in bytes, the $\oplus$ is a bit-wise exclusive OR and $WK_a(K)$ is an encrypted 256-bit AES key.

In one example, the single data key size is used as a maximum cipher (encryption/decryption) data block size of, e.g., the encrypt function to encrypt/decrypt each data key part as a separate data block to make use of an extra XOR 665 (which may be bypassed in the first block using a zero initial chaining value) to alter the encryption/decryption result to provide the non-first data key parts protection.

Other examples and variations are possible.

Example program exceptions that may occur during execution of the Perform Cryptographic Key Management Operation instruction include access (fetch, parameter block; store, parameter block; fetch and store, cryptography counter); operation (if, e.g., the message-security-assist extension 3 is not installed); privileged operation; specification; transaction constraint; etc. Additional, fewer and/or other program exceptions may occur in other embodiments and/or for other architectures.

In the description herein of a perform cryptographic key management operation instruction, such as Perform Cryptographic Key Management Operation instruction 500, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the instruction may include additional fields, and the fields may be separate and independent from one another; however, in other embodiments, more than one field may be combined. Further, although example types of registers are used, other types of registers may be used. Other examples are possible.

A perform cryptographic key management operation instruction, such as the Perform Cryptographic Key Management Operation instruction, may have additional, fewer and/or other fields. Many variations are possible.

Although various examples are provided for one or more formats of the instruction, additional and/or other formats may be used. Further, the processing may be used for other purposes than described herein.

An example of a cipher instruction used in one or more aspects of the present disclosure includes, for instance, a Cipher Message instruction. In one example, the Cipher Message instruction is a single architected hardware machine instruction at the hardware/software interface. As an example, the cipher message instruction is part of an instruction set architecture. One example of an instruction set architecture to incorporate and/or use the cipher message instruction and/or aspects of the present disclosure is the z/Architecture® instruction set architecture offered by International Business Machines Corporation, Armonk, New York. The z/Architecture instruction set architecture, however, is only one example architecture; other architectures and/or other types of computing environments of International Business Machines Corporation and/or of other entities/companies may include and/or use one or more aspects of the present disclosure.

Referring to FIG. 7A, in one example, a Cipher Message instruction 700 includes at least one operation code (opcode) field 702 having an operation code that indicates that this is a cipher message operation; one register field ($R_1$) 704; and another register field ($R_2$) 706. In one particular example, Cipher Message instruction 700 has a format, referred to as a register and register with an extended opcode format, having, e.g., 32 bits. In this particular example, Cipher Message instruction 700 has an operation code field 702 (e.g., bits 0-15); one register field ($R_1$) 704 (e.g., bits 24-27); and another register field ($R_2$) 706 (e.g., bits 28-31). Although in this example there is one opcode field 702, in other examples, there may be more than one opcode field. For instance, there may be one opcode field at the beginning of the instruction format and one opcode field at the end of the instruction format. Other examples are also possible.

In one example, referring to FIG. 7B, register field ($R_1$) 704 specifies a register 710 ($R_1$) that includes a first operand address 712 of a first operand of the instruction. Further, in one example, referring to FIG. 7C, register field ($R_2$) 706 specifies a register 720 ($R_2$) that includes a second operand address 722 of a second operand of the instruction. Referring to FIG. 7D, another register 730 ($R_2$+1) includes a length 732 of the second operand.

In one example, the $R_1$ field designates a general register and is to designate an even-numbered register other than, e.g., general register 0; otherwise, a specification exception is recognized. The $R_2$ field designates an even-odd pair of general registers and is to designate an even-numbered register other than, e.g., general register 0. In other examples, other types of registers other than general registers may be used. Further, registers other than even-numbered registers may be used. Many examples are possible.

In one example, the location of the leftmost byte of the first and second operands is specified by the contents of the $R_1$ and $R_2$ general registers, respectively. The number of bytes in the second operand location is specified in, e.g., general register $R_2$+1. The first operand is the same length as the second operand, in one example.

As part of the operation, the addresses in general registers $R_1$ and $R_2$ are incremented by the number of bytes processed and the length in general register $R_2$+1 is decremented by the same number. The formation and updating of the addresses and length is dependent on, for instance, the addressing mode.

In, for instance, the 24-bit addressing mode, the contents of bit positions 40-63 of general registers $R_1$ and $R_2$ constitute the addresses of the first and second operands, respectively, and the contents of bit positions 0-39 are ignored; bits 40-63 of the updated addresses replace the corresponding bits in general registers $R_1$ and $R_2$, carries out of, e.g., bit position 40 of the updated addresses are ignored, and the contents of bit positions 32-39 of general registers $R_1$ and $R_2$ are set to, e.g., zeros. In the 31-bit addressing mode, the contents of bit positions 33-63 of general registers $R_1$ and $R_2$ constitute the addresses of the first and second operands, respectively, and the contents of bit positions 0-32 are ignored; bits 33-63 of the updated addresses replace the corresponding bits in general registers $R_1$ and $R_2$, carries out of, e.g., bit position 33 of the updated addresses are ignored, and the content of bit position 32 of general registers $R_1$ and $R_2$ is set to zero. In the 64-bit addressing mode, the contents of bit positions 0-63 of general registers $R_1$ and $R_2$ constitute the addresses of the first and second operands, respectively; bits 0-63 of the updated addresses replace the contents of general registers $R_1$ and $R_2$, and carries out of, e.g., bit position 0 are ignored. Other examples are possible.

In both the 24-bit and the 31-bit addressing modes, the contents of bit positions 32-63 of general register $R_2+1$ form a 32-bit unsigned binary integer which specifies the number of bytes in the first and second operands, and the contents of bit positions 0-31 are ignored; bits 32-63 of the updated value replace the corresponding bits in general register $R_2+1$. In the 64-bit addressing mode, the contents of bit positions 0-63 of general register $R_2+1$ form a 64-bit unsigned binary integer which specifies the number of bytes in the first and second operands; and the updated value replaces the contents of general register $R_2+1$.

In the 24-bit or 31-bit addressing mode, the contents of bit positions 0-31 of general registers $R_1$, $R_2$, and $R_2+1$, remain unchanged, in one example.

In the access register mode, access registers 1, $R_1$ and $R_2$ specify the address spaces containing the parameter block, first and second operands, respectively.

Further, in one example, the Cipher Message instruction uses multiple implied general registers, such as general register 0 (GR0) and general register 1 (GR1). These registers are referred to as implied registers since they are not explicitly referenced by one or more fields of the instructions; however, they are used by the instructions. Examples of the registers are described below.

In one example referring to FIG. 7E, a general register 0 (740) includes, for instance:

Modifier 744 (e.g., bit 56): When the function code (e.g., bits 57-63 of general register 0) is, e.g., nonzero, modifier field 744 (e.g., bit 56) includes a modifier control (e.g., modifier bit) indicating encryption or decryption is to be performed by the function. When modifier field 744 is, e.g., zero, the function performs encryption of the second operand (e.g., the value in $R_2$); when modifier field 744 is, e.g., one, the function performs decryption of the second operand; and Function code 746 (e.g., bits 57-63): Function code field 746 includes the function code that specifies a function to be performed by the Cipher Message instruction. The instruction is configured to specify and implement a plurality of functions. An example function to be used in accordance with one or more aspects of the present disclosure includes, for instance, a function code (e.g., function code 90) that specifies for the cipher message instruction, e.g., a cipher message full XTS encrypted AES 128 double key function; etc. Although an example function and/or function code is specified, additional, fewer and/or other functions/function codes may be specified and/or used. Many examples are possible.

Further, in one example, selected bits, e.g., one or more bits 0-55 of general register 0 are ignored, depending on the selected function code. This is only one example. In other examples, one or more bits or no bits are to include a specific value, such as zero. Further, in other examples, values other than zero may be used. Many examples are possible. For example, when the Cipher Message instruction Cipher Message Full XTS Encrypted AES 128 function is specified, bit positions 0-31 of general register 0 are ignored and bit positions 32-55 of general register 0 are reserved and are to contain a selected value, such as zeros; otherwise, the program may not operate compatibly in the future. Other examples are possible for the instruction, as well as for each function.

One example of general register 1 is depicted in FIG. 7F. In one example, a general register 1 (750) includes an address 752 of a parameter block in storage (e.g., memory, storage, etc.). For instance, address 752 is a logical address of, for instance, a leftmost byte of the parameter block in storage. In one example, the location of the address in the general register depends on the addressing mode. For instance, in the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address and the contents of bit positions 0-32 are ignored. In the 64-bit addressing mode, the contents of bit positions 0-63 of general register 1 constitute the address. In the access register mode, access register 1 specifies the address space containing the parameter block. Other examples are possible.

One example of a parameter block used by the Cipher Message Full XTS Encrypted AES 128 function is described with reference to FIG. 7G. In one example, a parameter block, e.g., parameter block 760, used by the Cipher Message Full XTS Encrypted AES 128 function includes, for instance, an encrypted cryptographic key ($WK_a(K)$) 762 (e.g., byte offsets 0-31); a tweak value (i) 764 (e.g., byte offsets 32-47); a next alpha power (NAP) 766 (e.g., byte offsets 48-63); and an AES wrapping key verification pattern ($WK_aVP$) 768 (e.g., byte offsets 64-95). In one example, the tweak value and the next alpha power are in, e.g., little endian format. However, in one example, the, e.g., 8 bits in each byte of the parameter block are not in bit-reversed format, i.e., the leftmost bit of the byte is bit 0 and the rightmost bit of the byte is bit 7. Additional, fewer and/or other information is possible, as well as other examples and variations.

In one example, the Cipher Message instruction is executed (e.g., using execute instruction sub-module 330). Based on executing the instruction, the opcode is obtained (e.g., using obtain operands sub-module 332) indicating that this is a cipher operation, as well as addresses of the first and second operands and the parameter block to be used. Further, the function code specifying, e.g., a cipher function and a modifier control specifying encryption or decryption are obtained (e.g., using obtain operands sub-module 332). The specified function/operation are performed (e.g., using perform function/operation sub-module 334).

In operation of the Cipher Message instruction (e.g., instruction 700), in one example, the second operand (e.g., in register $R_2$) is ciphered as specified by the function code using a cryptographic key (e.g., encrypted cryptographic key 762) in the parameter block, and the result is placed in the first operand location (e.g., address specified in $R_1$). For XTS functions, ciphering may use a next alpha power in the parameter block (e.g., next alpha power 766).

In one example, for the Cipher Message Full XTS Encrypted AES 128 function, the contents of byte offsets 64-95 (e.g., AES wrapping key verification pattern 768) of the parameter block are compared with the contents of the AES wrapping key verification pattern register. If they mismatch, the parameter block location remains unchanged, and the operation is completed by setting condition code, e.g., 1. If they match, the contents of byte offsets 0-31 (e.g., encrypted cryptographic key 762; e.g., encrypted multiple-key as a single-encrypted-key) of the parameter block are deciphered using the AES wrapping key to obtain the 128-bit cryptographic key 1 (K1), aka data key (from the left-half), and the 128-bit cryptographic key 2 (K2), aka tweak key (from the right-half), pair. The 128-bit tweak value (i) is in byte offsets 32-47 (e.g., tweak value 764) of the parameter block and the 128-bit next alpha power (NAP) is in byte offsets 48-63 (e.g., next alpha power 766) of the parameter block.

Figures 8A, 8B:
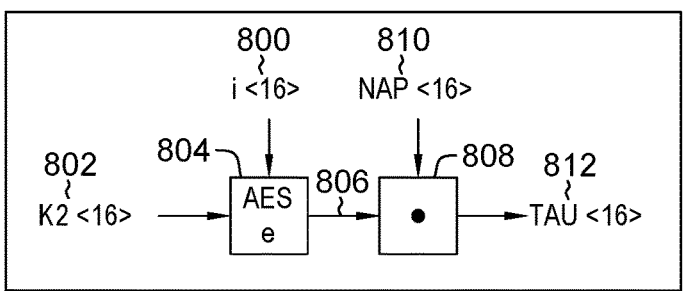
FIG. 8A depicts one example of a compute operation performed in accordance with one or more aspects of the present disclosure.
FIG. 8B depicts one example of an encipher operation performed in accordance with one or more aspects of the present disclosure.

In one example, as shown in FIG. 8A, the 128-bit tweak value (i) 800 is encrypted using the 128-bit tweak key (K2) 802 and the AES encryption algorithm (AES e) 804, and the result 806 is multiplied 808 by the next alpha power (NAP) 810 to produce a TAU 812 (e.g., an XTS parameter; also referred to as a mask). The multiplication operation is performed over $GF(2^{128})$.

When the modifier (M) bit in general register 0 is zero, an encipher operation is performed. In one example, as depicted in FIG. 8B, the 16-byte plaintext blocks (P1, P2, . . . , Pn) 820 in operand 2 are enciphered using the AES-encryption algorithm (AES e) 822, as an example.

Except for the first block, the TAU used is the TAU 842 for the previous block multiplied 844 by the value of 2 (846) in $GF(2^{128})$. To encrypt the first block of plaintext, the initial TAU 840 is used.

Except for the first block, the next alpha power (NAP) used is the next alpha power (NAP) 832 for the previous block multiplied 834 by the value of 2 (836) in $GF(2^{128})$. For the first block of plaintext, the initial next alpha power (NAP) 830 from the parameter block (e.g., next alpha power 766) is used.

In one example, as depicted in FIG. 8B, the TAU for each block is exclusive-ORed ($\oplus$) 850 with the corresponding plaintext (P) block 820. The result of the exclusive-OR operation is then encrypted (e) 822 using the AES-encryption algorithm with the 128-bit data key (K1) 852. The result of the encryption operation is exclusive-ORed 854 with the TAU (e.g., 840, 842 multiplied by 846, respectively) to produce the ciphertext (C) block 858. The next alpha power (NAP) for this block is multiplied by the value of 2 in $GF(2^{128})$ to obtain the next alpha power (NAP) for the next block. The TAU for this block is multiplied by the value of 2 in $GF(2^{128})$ to obtain the TAU for the next block.

The ciphertext blocks (C1, C2, . . . , Cn) are stored in operand 1. The result of the final TAU multiplication is called the output TAU.

Figure 8C:
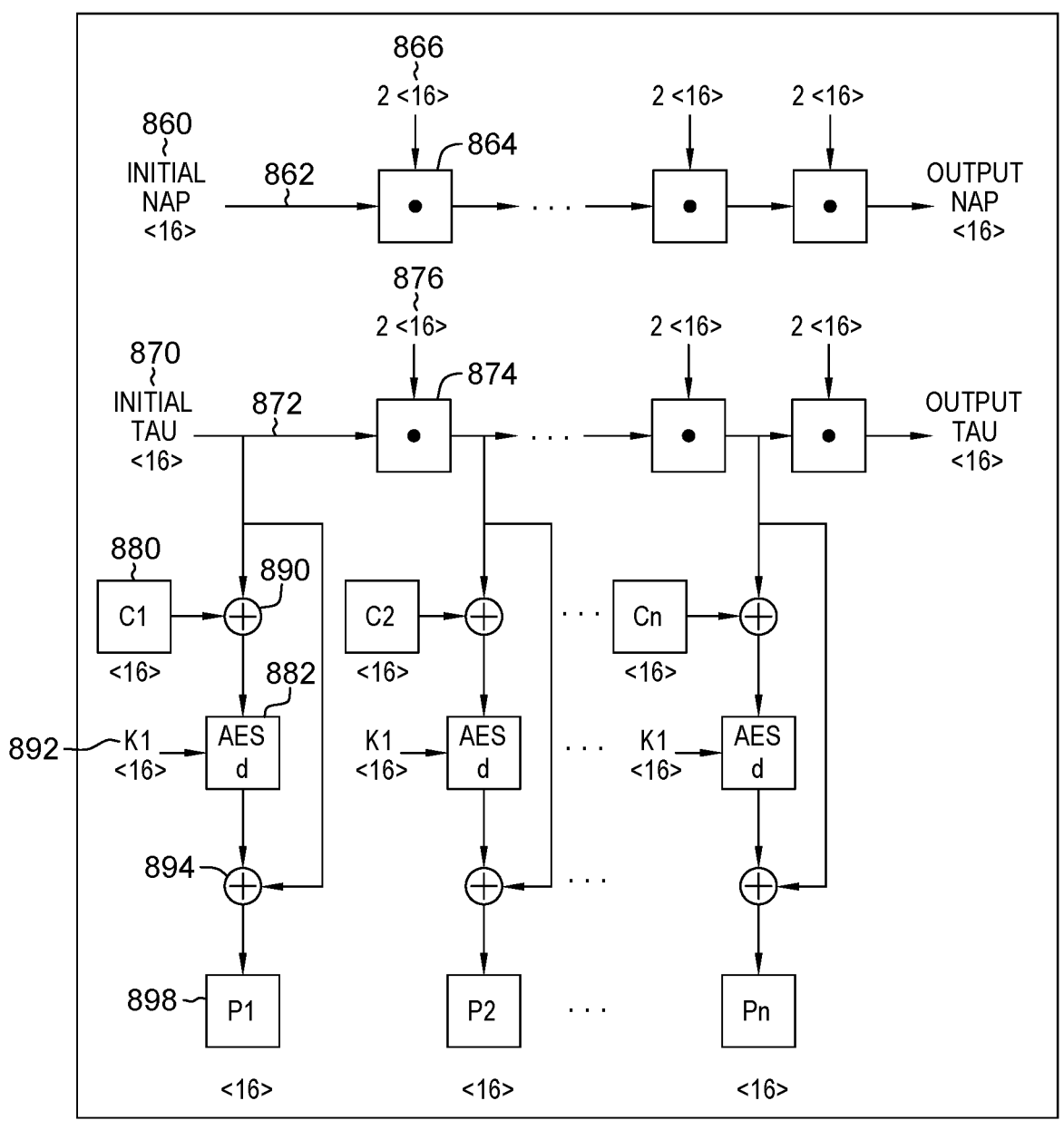
FIG. 8C depicts one example of a decipher operation performed in accordance with one or more aspects of the present disclosure.

When the modifier bit in general register 0 is one, a decipher operation is performed. In one example, as depicted in FIG. 8C, the 16-byte ciphertext blocks (C1, C2, . . . , Cn) 880 in operand 2 are deciphered using the AES-decryption algorithm (AES d) 882.

Except for the first block, the TAU used is the TAU 872 for the previous block multiplied 874 by the value of 2 (876) in $GF(2^{128})$. To decrypt the first block of ciphertext, the initial TAU 870 is used.

Except for the first block, the next alpha power (NAP) used is the next alpha power (NAP) 862 for the previous block multiplied 864 by the value of 2 (866) in $GF(2^{128})$. For the first block of ciphertext, the initial next alpha power (NAP) 860 from the parameter block is used.

In one example, the TAU for each block is exclusive-ORed (890) with the corresponding ciphertext block (880). The result of the exclusive-OR operation is then decrypted (882) using the AES-decryption algorithm with the 128-bit data key (K1) (892). The result of the decryption operation is exclusive-ORed (894) with the TAU (870, 872 multiplied by 876, respectively) to produce the plaintext block (898). The next alpha power (NAP) for this block is multiplied by the value of 2 in $GF(2^{128})$ to obtain the next alpha power (NAP) for the next block. The TAU for this block is multiplied by the value of 2 in $GF(2^{128})$ to obtain the TAU for the next block.

The plaintext blocks (P1, P2, . . . , Pn) are stored in operand 1. The result of the final TAU multiplication is called the output TAU.

The processing of the function completes after the last input text block is ciphered and condition code, e.g., 0 is set. When the operation ends due to partial completion, condition code, e.g., 3 is set. The next alpha power (NAP) is stored into the next alpha power (NAP) field of the parameter block.

Example resulting condition codes for the Cipher Message instruction include, for instance: 0 Normal completion; 1 Verification-pattern mismatch; 2-; 3 Partial completion.

In one example, the result is obtained as if processing starts at the left end of both the first and second operands and proceeds to the right, block by block. The cipher operation is ended when the number of bytes in the second operand as specified in general register $R_2+1$ have been processed and placed at the first operand location or when a central processing unit determined number of blocks that is less than the length of the second operand have been processed. The central processing unit determined number of blocks depends on the model, and may be a different number each time the instruction is executed. The central processing unit determined number of blocks is typically, e.g., nonzero. In certain unusual situations, this number may be zero, and condition code, e.g., 3 may be set with no progress. However, the central processing unit protects against endless reoccurrence of this no-progress case.

The results in the first operand location or the next alpha power field are unpredictable if, e.g., any of the following situations occur: The cryptographic key field or the encrypted cryptographic key field overlaps any portion of the first operand; the next alpha power field overlaps any portion of the first operand or the second operand; the first and second operands overlap destructively. Operands are said to overlap destructively when the first operand location would be used as a source after data would have been moved into it, assuming processing to be performed from left to right and one byte at a time.

As examples, normal completion occurs when the cipher operation has ended. Partial completion occurs when a central processing unit determined number of blocks that is less than the length of the second operand have been processed.

When the operation ends due to normal completion, condition code, e.g., 0 is set and the resulting value in $R_2+1$ is zero. When the operation ends due to partial completion, condition code, e.g., 3 is set. In this case, in one example, if the central processing unit is enabled to update counters in, e.g., a cryptography counter set, all of the second operand has been processed, and the appropriate counter is not accessible, then the resulting value placed in general register $R_2+1$ is zero; otherwise, the resulting value placed in general register $R_2+1$ is nonzero.

In one example, a PER (program event recording) storage alteration event may be recognized both for the first operand location and for the portion of the parameter block that is stored. A PER zero address detection event may be recognized for the first and second operand locations and for the parameter block. When PER events are detected for one or more of these locations, it is unpredictable which location is identified in the PER access identification and PER ASCE (address space control element) ID (identifier).

When a storage alteration PER event is recognized, fewer than 4K additional bytes are stored into the first operand locations before the event is reported, in one example.

When the second operand length is initially zero, the following occurs, in one example. The parameter block, first, and second operands are not accessed, and general registers $R_1$, $R_2$, and $R_2+1$ are not changed. If the central processing unit is not enabled to update counters in the cryptography counter set, then condition code, e.g., 0 is set. If the central processing unit is enabled to update counters in the cryptography counter set, and the appropriate counter is accessible, then the appropriate counter is updated and condition code, e.g., 0 is set. If the central processing unit is enabled to update counters in the cryptography counter set, and the appropriate counter is not accessible, then the condition code remains unchanged and an access exception is recognized for the location of the appropriate counter.

When the contents of the $R_1$ and $R_2$ fields are the same, the contents of the designated registers are incremented only by the number of bytes processed, not by twice the number of bytes processed.

As observed by this central processing unit, other central processing units, and channel programs, references to the parameter block and storage operands may be multiple-access references, accesses to these storage locations are not necessarily block-concurrent, and the sequence of these accesses or references is undefined.

In certain unusual situations, instruction execution may complete by setting condition code, e.g., 3 without updating the registers to reflect the last unit of the first and second operands processed. The size of the unit processed in this case depends on the situation and the model but is limited such that the portion of the first and second operands which have been processed and not reported do not overlap in storage. In, e.g., all cases, change bits are set and PER storage alteration events are reported, when applicable, for the first operand locations processed.

For functions that perform a comparison of the wrapping key verification pattern field in the parameter block with the wrapping key verification pattern register, it is unpredictable whether access exceptions and PER zero address detection events are recognized for the first and second operands when the comparison results in a mismatch.

Access exceptions may be reported for a larger portion of an operand than is processed in a single execution of the instruction; however, access exceptions are not recognized for locations beyond the length of an operand nor for locations more than, e.g., 4K bytes beyond the current location being processed. In one or more examples, for full XTS functions, the entire parameter block may be tested for store-type accesses even though part of it may not be stored. For all other functions, only the portion of the parameter block that is stored may be tested for store-type accesses, as an example.

Example program exceptions that may occur during execution of the Cipher Message instruction include, for instance: Access (fetch, operand 2, cryptographic key, and cryptographic key 1, cryptographic key 2, wrapping-key verification pattern, and tweak value; store, operand 1; fetch and store, XTS parameter, next alpha power (NAP), and cryptography counter); Operation (if the message-security assist is not installed); Specification; Transaction constraint.

One example of execution priority is indicated below:

1.-6. Exceptions with the same priority as the priority of program-interruption conditions for the general case.

7.A Access exceptions for second instruction halfword.

7.B Operation exception.

7.C Transaction constraint

8. Specification exception due to invalid function code or invalid register number.

9. Specification exception due to invalid operand length.

10. Access exceptions for an access to a cryptography counter and second-operand length originally zero.

11. Condition code 0 due to second-operand length originally zero.

12.A.1 Access exceptions for an access to the parameter block.

12.A.2. Condition code 1 due to verification-pattern mismatch.

12.B Access exceptions for an access to the first, or second operand.

13. Condition code 3 due to partial completion (second-operand length still nonzero).

14. Condition code 3 due to second-operand length stepped to zero and access-exception condition detected for an access to a cryptography counter.

15. Condition code 0 due to normal completion (second-operand length originally nonzero, but stepped to zero).

In the description herein of a cipher message instruction, such as Cipher Message instruction 700, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are used, other types of registers may be used. Other examples are possible.

A cipher message instruction, such as the Cipher Message instruction, may have additional, fewer and/or other fields. For instance, one or more fields of a cipher message instruction, such as the Cipher Message instruction, may be optional. Many variations are possible.

Although various examples are provided for one or more formats of each instruction, additional and/or other formats may be used. Further, the processing may be used for other purposes than described herein.

In one or more aspects, a key protection capability is provided that protects selected keys (referred to as protected keys), such as tweak encryption keys and/or other keys, from being discovered and/or used. By placing the protected keys in a particular order of a set of data keys to be encrypted, such as not first in the data set, and encrypting the set of data keys as a single encrypted data key, protections are provided for the protected keys making it more difficult to discover those keys. The multiple data keys appear as one key and are in a different order (e.g., reverse order) from use. In one example, this protects a protected key from being used by other single key algorithms.

Further, by using a single architected instruction to decrypt the single encrypted data key producing a plurality of original clear keys and then using, by the single architected instruction, one or more of those original clear keys to encrypt confidential data (e.g., a tweak value), which may be used in a cipher operation performed by the single architected instruction, additional protections for the confidential data and the protected keys are provided.

In one or more aspects, a single encrypted key (generated from encrypting multiple keys) received from one function (e.g., of the perform cryptographic key management operation instruction) is provided to another function (e.g., of the cipher message instruction) to perform cipher operation(s). In one or more aspects, the single encrypted key is decrypted using the other function (e.g., a cipher operation function) to obtain multiple original clear keys. The individual clear keys are obtained based on a specific key position format and each clear key is used to perform a respective cipher operation. At least one of the keys is a protected key.

In one or more aspects, an encryption technique is used to compute the single encrypted key such that it cannot be used to perform cryptographic operations that use only the protected key (e.g., to extract the encrypted protected key).

In one or more aspects, a cipher block chaining technique is used to protect the set of protected data keys. In one or more aspects, a data block size used in the cipher (encryption/decryption) is not larger than a single data key size in order to hide the set of protected data keys.

Figure 9A:
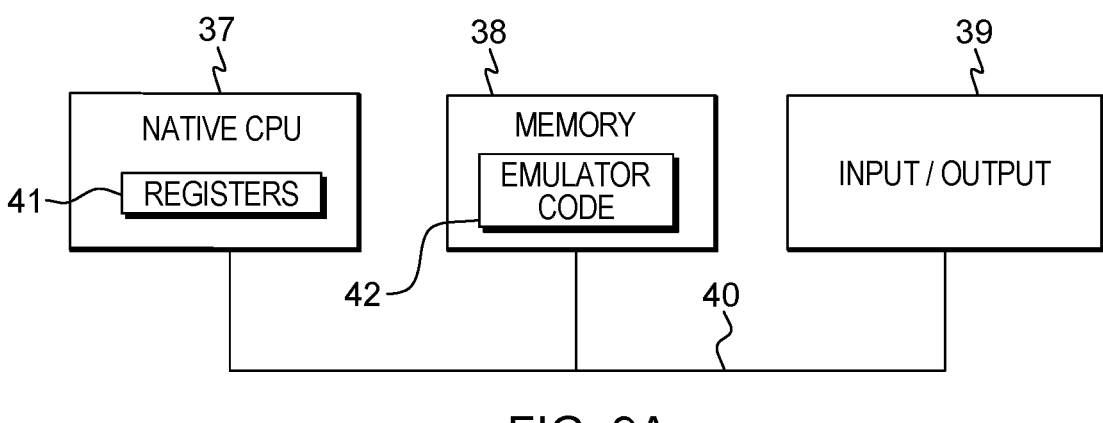
FIGS. 9A-9B depict another example of a computing environment to incorporate and use one or more aspects of the present disclosure.
Figure 9B:
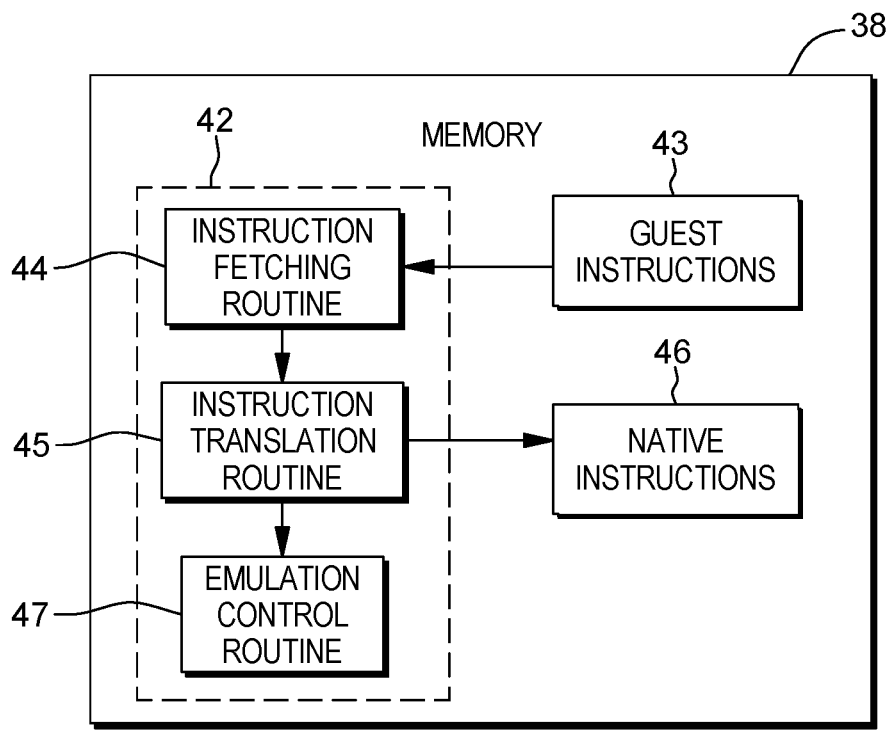

Although one or more examples of a computing environment to incorporate and use one or more aspects of the present disclosure are described herein, FIGS. 9A-9B depict another embodiment of a computing environment to incorporate and use one or more aspects of the present disclosure.

Referring, initially, to FIG. 9A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native central processing unit 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native central processing unit 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native central processing unit or by using locations in memory 38. In embodiments, guest instructions 43, native instructions 46 and emulator code 42 may reside in the same memory or may be disbursed among different memory devices.

Example instructions that may be emulated are the Perform Cryptographic Key Management Operation and the Cipher Message and instructions described herein, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement key protection processing and/or to perform one or more other aspects of the present disclosure.

One or more aspects of the present disclosure are tied to computer technology and facilitate processing within a computer, improving performance thereof. For instance, processing speed is increased and latency is reduced by using one instruction, e.g., one cipher instruction to perform the encipher, as well as the decipher. Further, security within a computing environment is improved by protecting selected data keys, such as protected keys used to encrypt/decrypt confidential data. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Further, other cryptographic algorithms may be used. Moreover, additional, fewer and/or other modules/sub-modules may be used. Although a particular sub-module may be provided as an example of performing a particular operation or task, one or more additional and/or other sub-modules may be used. Sub-modules may be combined and are separated into other sub-modules. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
a set of one or more computer readable storage media; and
program instructions, collectively stored in the set of one or more computer readable storage media, for causing at least one computing device to perform computer operations including:
obtaining a set of data keys arranged in a particular order, the set of data keys including multiple data keys, the multiple data keys including a protected key, and wherein the protected key is prevented from being in a selected position within the particular order;
encrypting the set of data keys as a single encrypted key, the single encrypted key being an encryption of the multiple data keys, and wherein the encrypting the set of data keys is performed using a selected computer instruction, wherein the selected computer instruction obtains the set of data keys as an input to the selected computer instruction; and
returning the single encrypted key, the single encrypted key to be decrypted to obtain multiple decrypted keys, at least one decrypted key of the multiple decrypted keys being a decrypted protected key to be used in encryption of a confidential value.

2. The computer program product of claim 1, wherein the selected computer instruction is a selected architected instruction.

3. The computer program product of claim 1, wherein the computer operations further comprise decrypting the single encrypted key to obtain the multiple decrypted keys, including the decrypted protected key, and encrypting the confidential value using the decrypted protected key.

4. The computer program product of claim 3, wherein the decrypting the single encrypted key and the encrypting the confidential value using the decrypted protected key are performed using a single architected instruction.

5. The computer program product of claim 3, wherein the multiple decrypted keys further include a decrypted key, and wherein the computer operations further include encrypting plaintext using the decrypted key.

6. The computer program product of claim 5, wherein the decrypting the single encrypted key, the encrypting the confidential value using the decrypted protected key and the encrypting the plaintext using the decrypted key are performed using a single architected instruction.

7. The computer program product of claim 6, wherein the single encrypted key is provided to the single architected instruction in a parameter block that is an input to the single architected instruction, the single architected instruction being a different instruction than a selected architected instruction used to encrypt the set of data keys as the single encrypted key.

8. The computer program product of claim 1, wherein the selected computer instruction is a selected architected instruction, the selected architected instruction obtaining the set of data keys in an input parameter block of the selected architected instruction.

9. The computer program product of claim 1, wherein the selected position is a first position within the set of data keys.

10. The computer program product of claim 1, wherein the confidential value is a tweak value and the protected key is a key used to encrypt the tweak value.

11. The computer program product of claim 1, wherein the set of data keys includes a fake data key in the selected position based on data keys of the set of data keys other than the fake data key being protected keys.

12. The computer program product of claim 1, wherein the particular order includes an arrangement in which one or more data keys of the set of data keys are in order of use.

13. A computer system comprising:

at least one computing device;

a set of one or more computer readable storage media; and program instructions, collectively stored in the set of one or more computer readable storage media, for causing the at least one computing device to perform computer operations including:

obtaining a set of data keys arranged in a particular order, the set of data keys including multiple data keys, the multiple data keys including a protected key, and wherein the protected key is prevented from being in a selected position within the particular order;

encrypting the set of data keys as a single encrypted key, the single encrypted key being an encryption of the multiple data keys, and wherein the encrypting the set of data keys is performed using a selected computer instruction, wherein the selected computer instruction obtains the set of data keys as an input to the selected computer instruction; and returning the single encrypted key, the single encrypted key to be decrypted to obtain multiple decrypted keys, at least one decrypted key of the multiple decrypted keys being a decrypted protected key to be used in encryption of a confidential value.

14. The computer system of claim 13, wherein the computer operations further comprise decrypting the single encrypted key to obtain the multiple decrypted keys, including the decrypted protected key, and encrypting the confidential value using the decrypted protected key.

15. The computer system of claim 14, wherein the decrypting the single encrypted key and the encrypting the confidential value using the decrypted protected key are performed using a single architected instruction.

16. The computer system of claim 13, wherein the set of data keys includes a fake data key in the selected position based on data keys of the set of data keys other than the fake data key being protected keys.

17. A computer-implemented method comprising:

obtaining a set of data keys arranged in a particular order, the set of data keys including multiple data keys, the multiple data keys including a protected key, and wherein the protected key is prevented from being in a selected position within the particular order;

encrypting the set of data keys as a single encrypted key, the single encrypted key being an encryption of the multiple data keys, and wherein the encrypting the set of data keys is performed using a selected computer instruction, wherein the selected computer instruction obtains the set of data keys as an input to the selected computer instruction; and returning the single encrypted key, the single encrypted key to be decrypted to obtain multiple decrypted keys, at least one decrypted key of the multiple decrypted keys being a decrypted protected key to be used in encryption of a confidential value.

18. The computer-implemented method of claim 17, wherein the computer operations further comprise decrypting the single encrypted key to obtain the multiple decrypted keys, including the decrypted protected key, and encrypting the confidential value using the decrypted protected key.

19. The computer-implemented method of claim 18, wherein the decrypting the single encrypted key and the encrypting the confidential value using the decrypted protected key are performed using a single architected instruction.

20. The computer-implemented method of claim 17, wherein the set of data keys includes a fake data key in the selected position based on data keys of the set of data keys other than the fake data key being protected keys.

* * * * *